(12) United States Patent
Sawai

(10) Patent No.: US 7,354,212 B2
(45) Date of Patent: Apr. 8, 2008

(54) IMAGE FORMING APPARATUS

(75) Inventor: Kunio Sawai, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 366 days.

(21) Appl. No.: 11/184,875

(22) Filed: Jul. 20, 2005

(65) Prior Publication Data

US 2006/0022010 A1 Feb. 2, 2006

(30) Foreign Application Priority Data

Jul. 27, 2004 (JP) .............................. 2004-218119

(51) Int. Cl.
*B41J 13/02* (2006.01)
*F16H 55/17* (2006.01)
(52) U.S. Cl. ................... 400/636.2; 400/691; 400/693; 74/434; 74/439; 271/8.1; 384/114; 384/129; 384/291; 384/296; 384/416
(58) Field of Classification Search ................ 475/331, 475/346; 74/434–438, 439–440; 384/114, 384/129, 291, 296, 416; 400/636.2
See application file for complete search history.

(56) References Cited

FOREIGN PATENT DOCUMENTS

| JP | 53-147165 | * 12/1978 |
| JP | 09-042422 A | 2/1997 |
| JP | 11-262959 A | 9/1999 |

* cited by examiner

*Primary Examiner*—Daniel J. Colilla
*Assistant Examiner*—Marissa L Ferguson-Samre
(74) *Attorney, Agent, or Firm*—Global IP Counselors, LLP

(57) ABSTRACT

An image forming apparatus includes a chassis, a motor, a drive transmission gear that receives rotational force from the motor, a feed roller rotatably supported by the chassis, an intermediate gear that has a circular bearing, receives rotational force from the drive transmission gear, and transmits rotational force to the feed roller gear, and a gear support axle that is inserted through the bearing of the intermediate gear for rotatably supporting the intermediate gear. The gear support axle is provided with a bearing engagement part. The bearing engagement part has at least one flat section, at least one circular section, and at least two support portions formed between the flat section and the circular section, such that the gear support axle is supported by the bearing at at least one of the two support portions.

9 Claims, 13 Drawing Sheets

PRIOR ART

IMAGE FORMING APPARATUS

BACKGROUND OF THE INVENTION

1. Field of the Invention

The present invention relates to an image forming apparatus. More specifically, the present invention relates to an image forming apparatus that has a gear axle.

2. Background Information

Heat transfer printers are known as an example of conventional image forming apparatuses. Such heat transfer printer is generally provided with a motor and a feed roller. A motor gear is mounted on the rotating axle of the motor. The heat transfer printer is also provided with a drive transmission gear and a feed roller intermediate gear between the motor gear and the feed roller gear. The drive force from the motor is transmitted to the feed roller gear and the feed roller via the drive transmission gear and the feed roller intermediate gear.

The feed roller intermediate gear is rotatably supported by an intermediate gear support axle mounted on the chassis. Also, the intermediate gear support axle has a mounting axle unit that is mounted on the chassis, and a bearing engagement part that rotatably supports the feed roller intermediate gear.

The feed roller intermediate gear meshes with the feed roller gear. A circular bearing unit 113a is provided to the feed roller intermediate gear 113, as shown in FIG. 25. A circular bearing engagement part 119b of the intermediate gear support axle 119 is inserted through the circular bearing unit 113a of the feed roller intermediate gear 113. The circular bearing unit 113a of the feed roller intermediate gear 113 contacts the circular bearing engagement part 119b of the intermediate gear support axle 119 at one location (Y) on the peripheral surface of the circular bearing engagement part 119b of the intermediate gear support axle 119, as shown in FIG. 25.

Also, the feed roller intermediate gear 113 has a small gear that meshes with the feed roller gear 106, and a large gear that meshes with the drive transmission gear 112, as shown in FIG. 25. The motor gear meshes with the large gear of the drive transmission gear 112, thereby transmitting the driving force from the motor gear to the feed roller gear 106 via the drive transmission gear 112 and the feed roller intermediate gear 113.

When the drive force is transmitted from the drive transmission gear 112 to the feed roller gear 106 via the feed roller intermediate gear 113, the feed roller intermediate gear 113 receives a force F8 from the drive transmission gear 112 that rotates in the R direction, and a reaction F9 in rotating the feed roller gear 106 in the T direction, which together create a resultant force F7, as shown in FIG. 25. The circular bearing unit 113a of the feed roller intermediate gear 113 is thereby pressed against the peripheral surface of the bearing engagement part 119b of the intermediate gear support axle 119 along the line of force F7.

Accordingly, a frictional force μF7 (where μ is a dynamic friction coefficient) is applied between the bearing engagement part 119b and the bearing unit 113a of the feed roller intermediate gear 113. Due to this frictional force μF7, the position at which the bearing unit 113a comes into contact with the bearing engagement part 119b moves to the Y position in FIG. 25, which is inclined at an angle θ3 in the rotation direction S of the feed roller intermediate gear 113 along the peripheral surface of the bearing engagement part 119b.

At the contact point Y, the frictional force μF7 and the resultant force balance each other out. In other words, the rotation angle θ3 at the contact point Y satisfies the following equation:

$$\mu F7 = F7 \tan \theta 3$$

Thus, the point of contact is prevented from moving any further. The bearing unit 113a of the feed roller intermediate gear 113 is thereby rotated while maintaining contact with the peripheral surface of the bearing engagement part 119b of the intermediate gear support axle 119 at the contact position Y.

When paper is conveyed in the opposite direction during the non-printing operation, the feed roller gear 106 rotates in the direction of the arrow X as the drive transmission gear 112 and the feed roller intermediate gear 113 rotate in the directions of the arrows V and W in FIG. 26, respectively.

At this time, the feed roller intermediate gear 113 receives a force F11 from the drive transmission gear 112, and a force F12 as a reaction in rotating the feed roller gear 106, which together create a resultant force F10, as shown in FIG. 26. The circular bearing unit 113a of the feed roller intermediate gear 113 is thereby pressed against the peripheral surface of the bearing engagement part 119b of the intermediate gear support axle 119 along the line of force F10. Accordingly, a frictional force μF10 (where μ is a dynamic friction coefficient) is applied between the bearing engagement part 119b and the bearing unit 113a of the feed roller intermediate gear 113. As a result of this frictional force μF10, the position at which the bearing unit 113a comes into contact with the bearing engagement part 119b moves along the line of force F10 to the Y position in FIG. 26, which is inclined at an angle θ4 in the W rotation direction of the feed roller intermediate gear 113 along the peripheral surface of the bearing engagement part 119b.

At the contact position Y, the frictional force μF10 that acts to move the point of contact and the force that prevents this movement balance each other out. In other words, the rotation angle θ4 at the contact point Y satisfies the following equation:

$$\mu F10 = F10 \tan \theta 4$$

Thus, as a result of inclination at this angle θ4, the point of contact is prevented from moving any further. The bearing unit 113a of the feed roller intermediate gear 113 is thereby rotated while maintaining contact with the peripheral surface of the bearing engagement part 119b of the intermediate gear support axle 119 at the contact position Y.

The conventional heat transfer printer shown in FIGS. 25 through 26 has drawbacks in that during printing, the magnitude of the frictional force μF7 that is applied between the bearing unit 113a of the feed roller intermediate gear 113 and the peripheral surface of the bearing engagement part 119b of the intermediate gear support axle 119 changes as the dynamic frictional coefficient μ changes due to fluctuations in the force F7 created by the rotation of the feed roller intermediate gear 113. Accordingly, the position Y where the bearing unit 113a comes into contact with the bearing engagement part 119b shifts left and right along the inner peripheral surface of the bearing engagement part 119b.

Specifically, this is disadvantageous in that the angle θ3 shown in FIG. 25 increases when the magnitude of the frictional force μF7 that is applied between the bearing unit 113a and the peripheral surface of the bearing engagement part 119b due to rotation increases as the force F7 increases since the dynamic friction coefficient μ changes as the force F7 changes. It is also disadvantageous in that the angle θ3 shown in FIG. 25 decreases when the magnitude of the frictional force µF7 that is applied between the bearing unit 113a and the peripheral surface of the bearing engagement part 119b due to the rotation decreases as the force F7 decreases. When the contact position Y moves, the feed roller intermediate gear 113 does not rotate, and moves instead along the peripheral surface of the bearing engagement part 119b of the intermediate gear support axle 119, causing fluctuations in the amount of rotation of the feed roller intermediate gear 113.

Also, the heat transfer printer has drawbacks in that during the non-printing operation, the magnitude of the frictional force µF10 that is applied between the bearing unit 113a of the feed roller intermediate gear 113 and the peripheral surface of the bearing engagement part 119b of the intermediate gear support axle 119 due to fluctuations in the force F10 that is applied changes due to the rotation of the feed roller intermediate gear 113 since the dynamic friction coefficient µ changes as the force F10 changes. (See FIG. 26). Accordingly, the position Y where the bearing unit 113a comes into contact with the bearing engagement part 119b moves left and right along the inner peripheral surface of the bearing engagement part 119b.

Specifically, this is disadvantageous in that the angle θ4 in FIG. 26 increases when the magnitude of the frictional force µF10 that is applied between the bearing unit 113a and the peripheral surface of the bearing engagement part 119b increases as the force F10 increases. It is also disadvantageous in that the angle θ4 shown in FIG. 26 decreases when the magnitude of the frictional force µF10 that is applied between the bearing unit 113a and the peripheral surface of the bearing engagement part 119b due to the rotation decreases as the force F10 decreases. When the contact position Y moves, the feed roller intermediate gear 113 does not rotate, and instead moves along the peripheral surface of the bearing engagement part 119b of the intermediate gear support axle 119, causing fluctuations in the amount of rotation of the feed roller intermediate gear 113.

As described above, when the angle θ3 or θ4 by which the feed roller intermediate gear 113 rotates fluctuates, the distance by which the paper (not shown) is conveyed also fluctuates because of the fluctuations in the rotation amount of the feed roller gear 106. Also, the accumulated fluctuations also increase proportionately when the number of intermediate gears is increased, and the paper is therefore fed even more non-uniformly. This is disadvantageous in that it becomes difficult to precisely control the conveyance of paper with the feed roller 102.

In conventional practice, the fit tolerance between the bearing unit 113a of the feed roller intermediate gear 113 and the bearing engagement part 119b of the intermediate gear support axle 119 is minimized in order to prevent such non-uniformities the paper feeding described above. Therefore, component precision must be improved, and, as a result, component costs tend to increase.

In view of the above, it will be apparent to those skilled in the art from this disclosure that there exists a need for an improved image forming apparatus that overcomes the problems of conventional art. This invention addresses this need in the art as well as other needs, which will become apparent to those skilled in the art from this disclosure.

SUMMARY OF THE INVENTION

It is an object of the present invention to provide an image forming apparatus that can better control the conveying of paper by the feed roller.

The image forming apparatus according to the first aspect of the present invention has a chassis, a motor, a drive transmission gear that receives rotational force from the motor, a feed roller rotatably supported by the chassis, a feed roller gear relatively unrotatably provided to the feed roller, an intermediate gear that has a circular bearing, receives rotational force from the drive transmission gear, and transmits rotational force to the feed roller gear, and a gear support axle that is inserted through the bearing of the intermediate gear for rotatably supporting the intermediate gear, and is provided with a bearing engagement part. The bearing engagement part has at least one flat section, at least one circular section, and at least two support portions formed between the flat section and the circular section, such that the gear support axle is supported by the bearing at at least one of the two support portions.

In the image forming apparatus described above, the bearing engagement part of the gear support axle is formed into a substantially oval shape with a flat section and a circular section, and the two support portions formed between the flat section and circular section. The bearing engagement part is disposed so as to support the circular bearing of the gear at two position inclined at a specific angle from the line which passes through the center of the intermediate gear and along which force is applied to the intermediate gear as a result of rotation.

In the image forming apparatus according to the second aspect of the present invention, the gear support axle is configured to be supported by the bearing at the two support portions.

Accordingly, the bearing of the intermediate gear is less likely to move along the outer peripheral surface of the bearing engagement part of the gear support axle as compared with the case where the bearing of the intermediate gear is supported at a single location on the peripheral surface of the bearing engagement part of the gear support axle. Therefore, it is possible to prevent the position at which the bearing of the intermediate gear contacts the bearing engagement part from moving along the outer peripheral surface of the bearing engagement part, even when the frictional force that is applied between the bearing of the gear and the two support portions of the gear support axle changes due to a change in the rotational force transmitted to the intermediate gear.

Fluctuations in the rotation of the intermediate gear can thereby be suppressed, making it possible to suppress fluctuations in the rotation the feed roller gear which results from fluctuations in the rotation of the intermediate gear. As a result, non-uniformity in feeding of paper by the feed roller can be prevented. It is therefore possible to accurately control the conveyance of paper. There is also no need to improve the precision of the components because the conveyance of paper can be better controlled by merely forming the bearing engagement part of the gear support axle into a substantially oval shape with a flat section and a circular section.

In the image forming apparatus according to the third aspect of the present invention, the support portions are formed so as to be positioned at an angular position θ relative to a center of the bearing and a center of the flat section. The angular position θ satisfies $\theta > \tan^{-1}\mu$ where µ is a dynamic frictional coefficient when a resultant of the rotational force received from the drive transmission gear and the rotational force transmitted to the feed roller gear is maximum.

In the image forming apparatus according to the fourth aspect of the present invention, the support portions of the bearing engagement part of the gear support axle have a chamfered shape. With such a configuration, the occurrence of scratches and the like in the bearing of the intermediate gear can be prevented while the intermediate gear is rotated with the circular bearing of the intermediate gear being supported by the two support portions of the bearing engagement part of the gear support axle.

In the image forming apparatus according to the fifth aspect of the present invention, the support portions of the bearing engagement part of the gear support axle have a rounded shape. With such a configuration, the occurrence of scratches and the like in the intermediate bearing of the gear can be prevented while the gear is rotated with the circular bearing of the gear being supported by the two support portions of the bearing engagement part of the gear support axle.

In the image forming apparatus according to the sixth aspect of the present invention, the chassis has a support axle mounting hole formed thereon, and the gear support axle further has a mounting axle that is mounted in the support axle mounting hole of the chassis by crimping.

In the image forming apparatus according to the sixth aspect of the present invention, the gear support axle further has a seat that is formed between the mounting axle and the bearing engagement part, the seat having an external shape greater than that of the bearing engagement part.

With such a configuration, when the mounting axle is mounted in the support axle mounting holes of the chassis by crimping, by using the oval flat section of the seat to position the angle of the gear support axle, it is possible to perform positioning by using a larger flat surface as a reference than the case where the flat section of the bearing engagement part is used to position the angle of the gear support axle. Therefore, the angle of rotation of the flat section of the gear support axle can be positioned more accurately.

In the image forming apparatus according to the eighth aspect of the present invention, the intermediate gear is configured to rotate in a forward and a reverse direction, and the bearing engagement part of the gear support axle has two flat section, two circular section, and first and second pairs of support portions formed between the flat sections and the circular sections, such that the gear support axle is supported by the bearing at either of the pairs of support portions regardless of the direction of the rotation of the intermediate gear.

With such a configuration, by forming the bearing engagement part of the gear support axle with two flat sections, it is possible to use the support portions on either of the flat sections depending on the direction of rotation. Thus, the position at which the bearing of the gear contacts the bearing engagement part can be prevented from moving along the outer peripheral surface of the bearing engagement part, not only when the gear rotates in the forward direction, but also when the gear rotates in the reverse direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
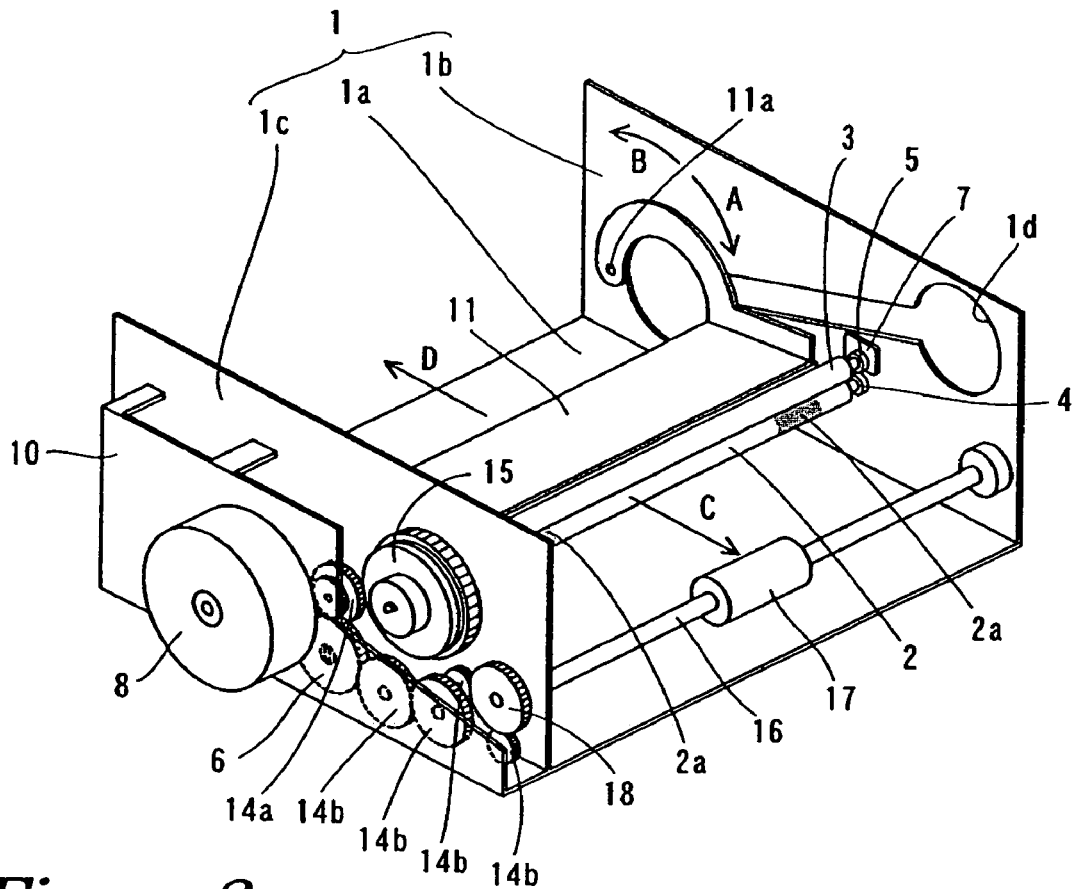
FIG. 1 is a perspective view of the entire configuration of the heat transfer printer according to the first embodiment of the present invention.
Figure 2:
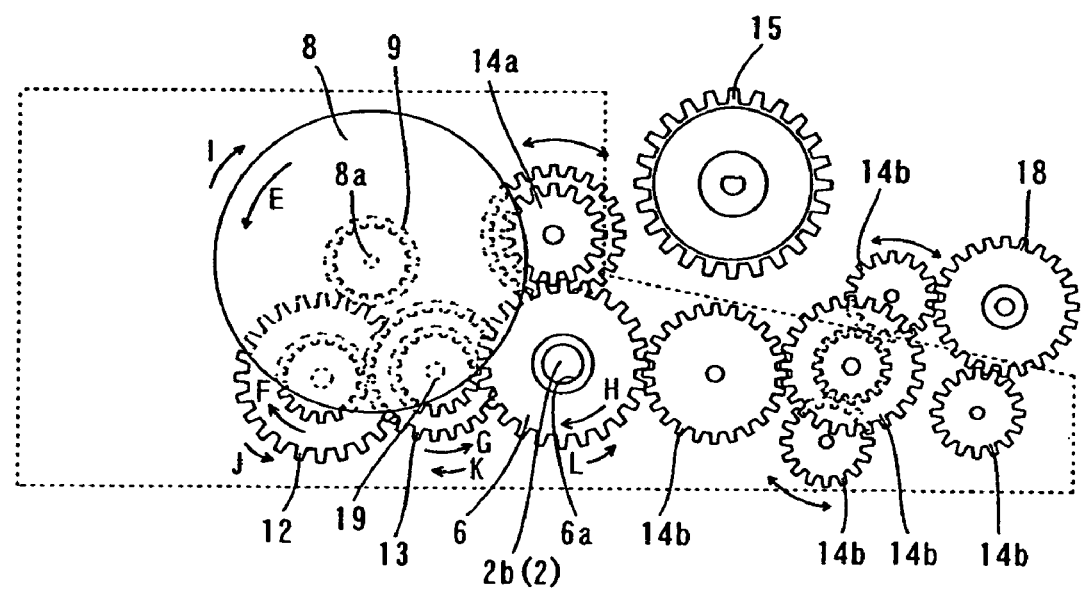
FIG. 2 is a schematic front view of the motor and the gears of the heat transfer printer according to the first embodiment shown in FIG. 1.

FIG. 1 is a perspective view showing the entire configuration of a heat transfer printer according to the first embodiment of the present invention. FIG. 2 is a front view showing the motor and the gears of the heat transfer printer according to the first embodiment shown in FIG. 1. FIGS. 3 through 8 are diagrams for describing the detailed structure of the heat transfer printer shown in FIG. 1. The structure of the heat transfer printer according to the first embodiment of the present invention will now be described with reference to FIGS. 1 through 8. In the first embodiment, the heat transfer printer is described as one example of an image forming apparatus.

As shown in FIGS. 1 and 2, the heat transfer printer according to the first embodiment of the present invention has a metallic chassis 1, a metallic feed roller 2 for feeding paper to a print unit, a metallic press roller 3 that comes into contact with the feed roller 2 with a specific amount of pressure, resinous feed roller bearings 4 and press roller bearings 5 for rotatably supporting both ends of the feed roller 2 and both ends of the press roller 3, respectively, a feed roller gear 6 mounted on the feed roller 2, a metallic bearing support plate 7 that supports the press roller bearing 5, a motor 8 which is a drive source, a motor gear 9 mounted on a rotational axle 8a of the motor 8, a metallic motor bracket 10 for mounting the motor 8, a thermal head 11, a drive transmission gear 12 for transmitting the drive force from the motor 8 to a feed roller intermediate gear 13, the feed roller intermediate gear 13 for rotating the feed roller gear 6, a pivotable intermediate gear 14a, a plurality of intermediate gears 14b, an ink sheet take-up gear 15, a roller axle 16, a rubber paper supply/ejection roller 17, and a roller axle gear 18. The feed roller intermediate gear 13 is an example of a "gear" and an "intermediate gear" in the present invention.

The chassis 1 is composed of a metal plate with a thickness of about 1 mm, and has a bottom surface 1a, and two side surfaces 1b and 1c that are provided so as to extend in a direction perpendicular to the top of the bottom surface 1a. These two side surfaces 1b and 1c are provided so as to face each other. Also, the side surface 1b is provided with an ink sheet insertion unit 1d for mounting ink sheets (not shown). Both ends of the feed roller 2 have a smaller diameter than that of the outer peripheral surface of the feed roller 2, and are rotatably supported by the pair of feed roller bearings 4 mounted on the side surfaces 1b and 1c of the chassis 1. The feed roller 2 has paper conveying portions 2a and a gear insertion portion 2b (see FIG. 2). Concavities and convexities are formed by the roll forming on the surface of the paper conveying portions 2a (see FIG. 1). Also, the gear insertion portion 2b (see FIG. 2) is pressed into an insertion hole 6a of the feed roller gear 6. The feed roller 2 and the feed roller gear 6 are thereby coupled to one another relatively unrotatably.

Figure 3:
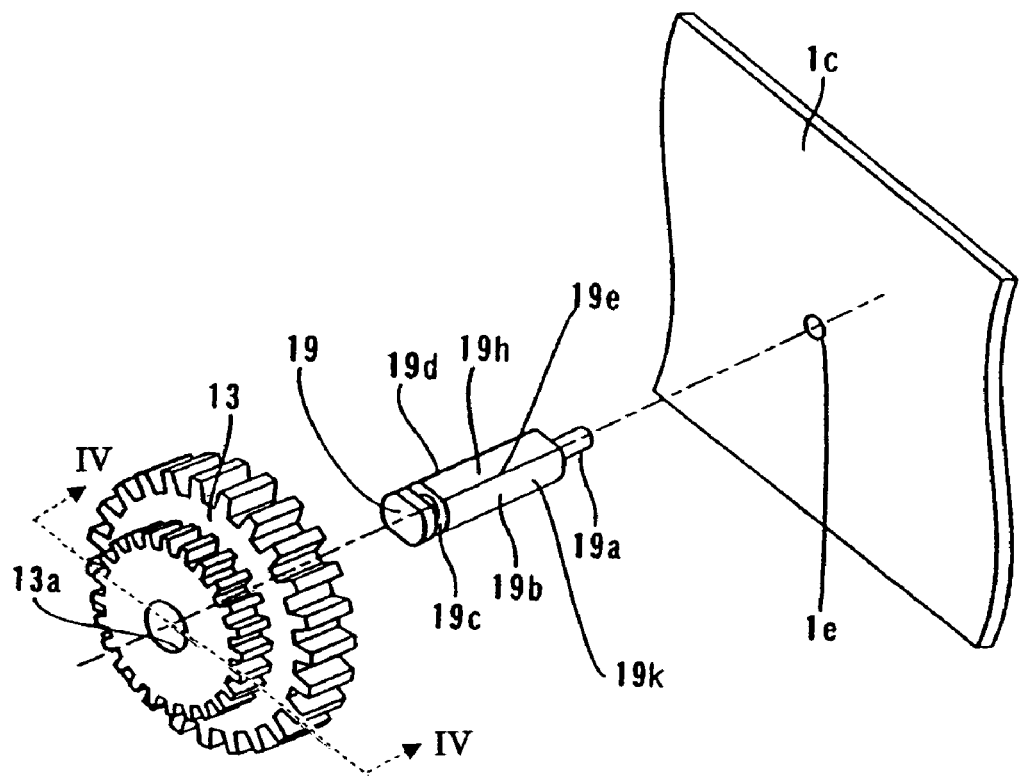
FIG. 3 is a partial exploded perspective view showing the mounting structure of the intermediate gear support axle of the heat transfer printer according to the embodiment shown in FIG. 1.

Also, the motor 8 is mounted on the side of the motor bracket 10 (see FIG. 1), which is mounted on the insertion unit 1c of the chassis 1. The motor 8 functions as a drive source for driving the feed roller 2, the thermal head 11, the ink sheet take-up unit (not shown), and the roller axle 16. The motor gear 9 is mounted on the rotational axle 8a of the motor 8 (see FIG. 2). The drive transmission gear 12 and the feed roller intermediate gear 13 are also provided between the motor gear 9 and the feed roller gear 6. The drive force from the motor 8 is transmitted to the feed roller gear 6 and the feed roller 2 via the drive transmission gear 12 and the feed roller intermediate gear 13. Also, the feed roller intermediate gear 13 is rotatably supported by a metallic intermediate gear support axle 19 mounted in a support axle mounting hole 1e formed on the side surface 1c of the chassis 1, as shown in FIG. 3. The intermediate gear support axle 19 is an example of the "gear support axle" and the "intermediate gear support axle" in the present invention.

Figure 4:
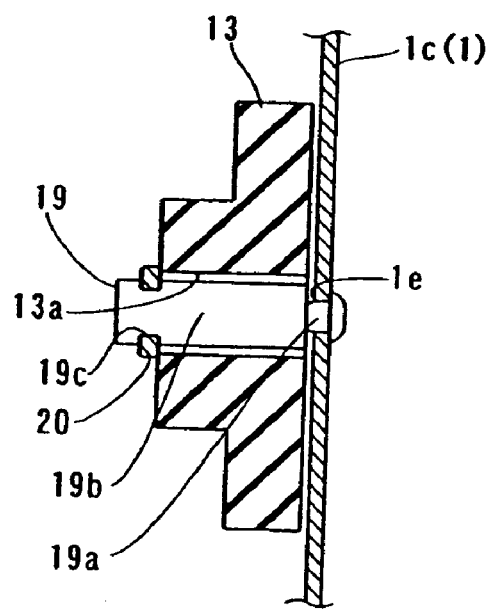
FIG. 4 is a cross-sectional view of the mounting structure of the intermediate gear support axle of the heat transfer printer according to the embodiment shown in FIG. 1, as viewed along the arrow IV-IV shown in FIG. 3.
Figure 5:
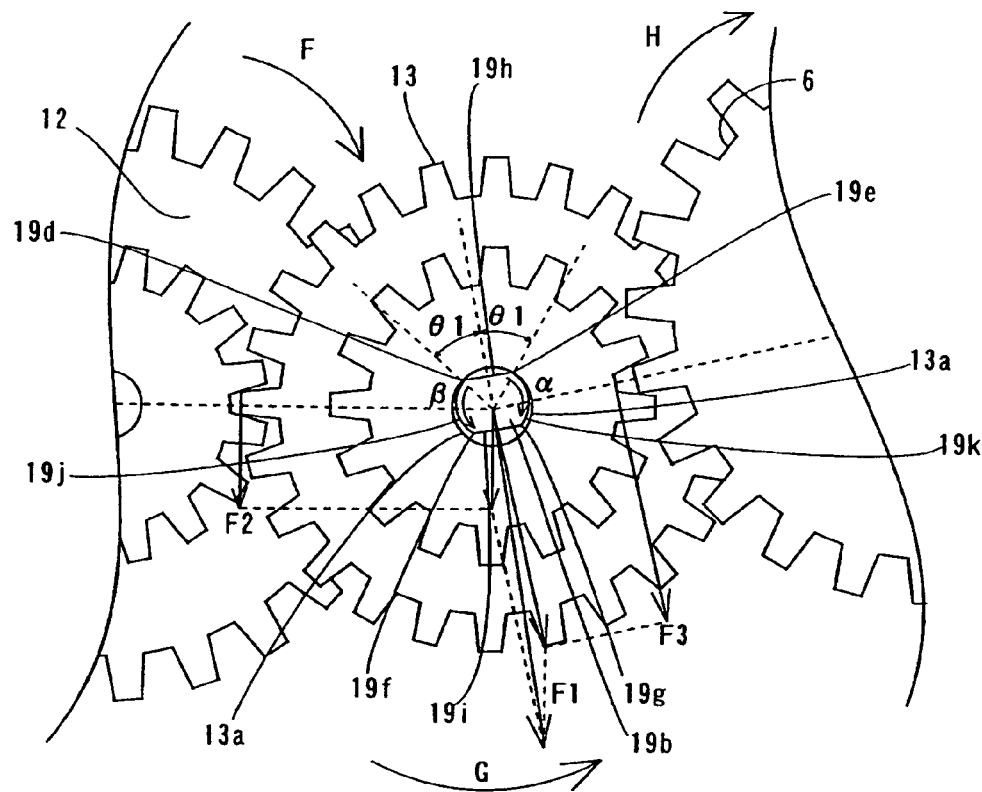
FIG. 5 is a partial detailed diagram of the feed roller intermediate gear of the heat transfer printer during the printing operation according to the embodiment shown in FIG. 1.
Figure 6:
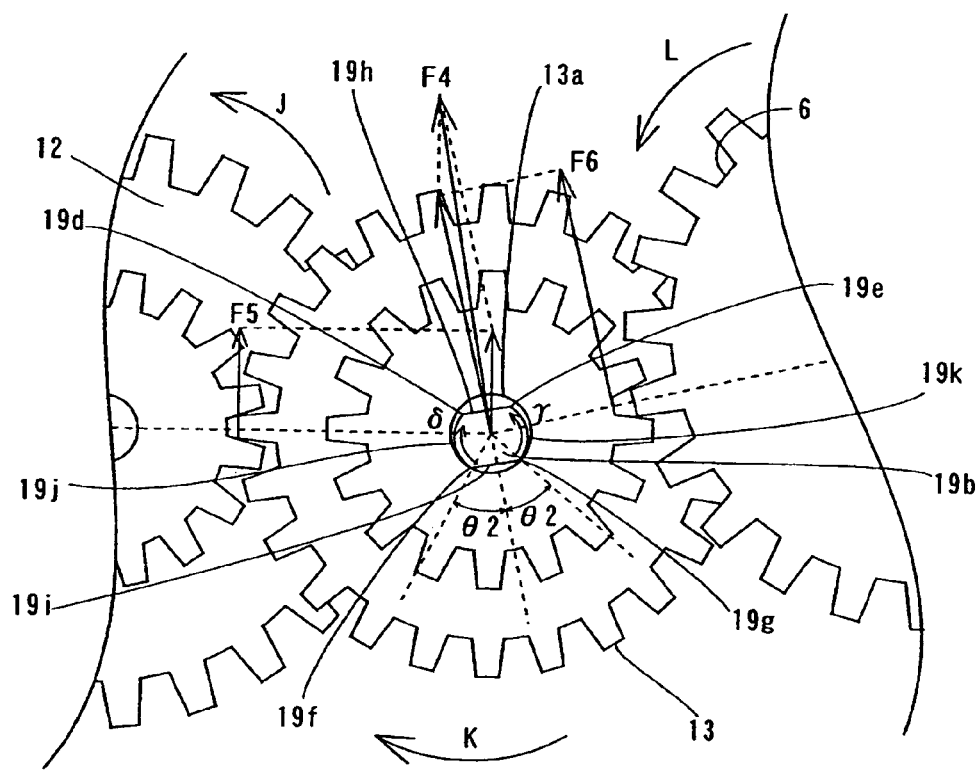
FIG. 6 is a detailed diagram of the feed roller intermediate gear of the heat transfer printer during the non-printing operation according to the embodiment shown in FIG. 1.
Figure 7:
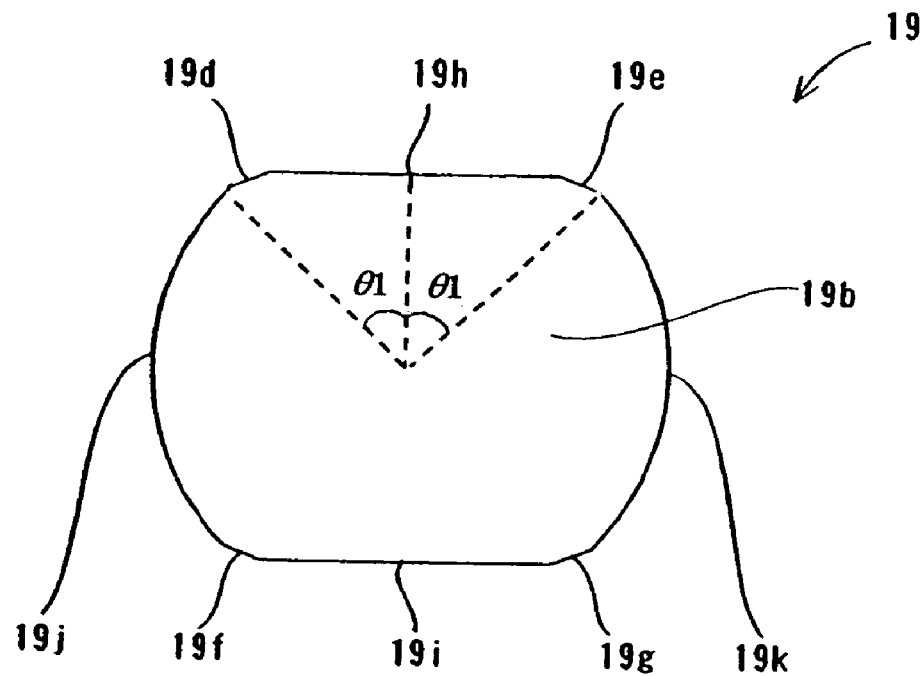
FIG. 7 is a detailed diagram of an example of the intermediate gear support axle of the heat transfer printer according to the embodiment shown in FIG. 1.
Figure 8:
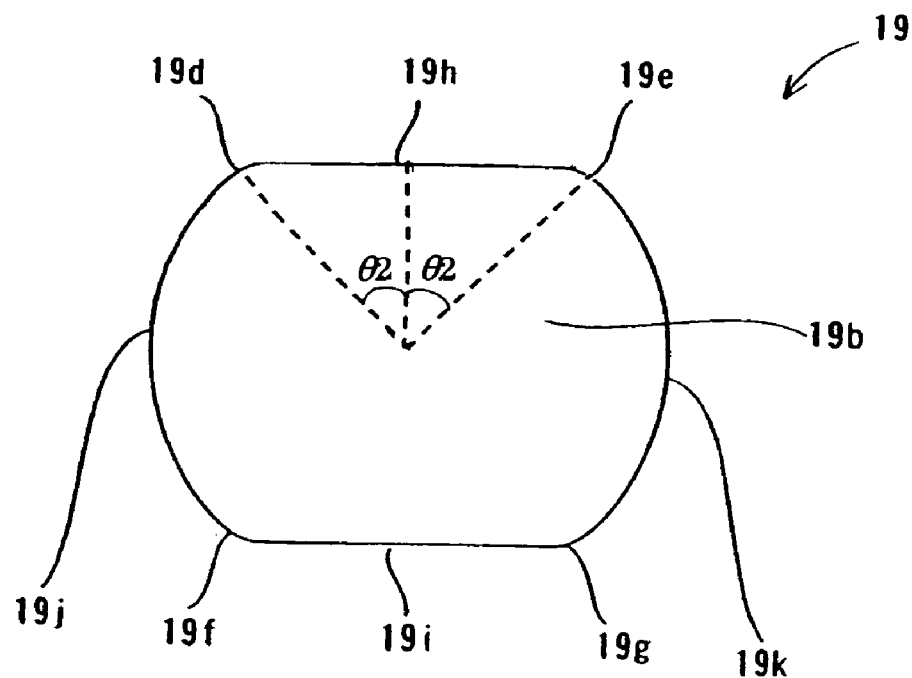
FIG. 8 is a detailed diagram of another example of the intermediate gear support axle of the heat transfer printer according to the embodiment shown in FIG. 1.

In the first embodiment, the intermediate gear support axle 19 has a mounting axle 19a mounted in the support axle mounting hole 1e, and a substantially oval bearing engagement part 19b for rotatably supporting the feed roller intermediate gear 13, as shown in FIGS. 3 and 4. This bearing engagement part 19b has four support portions 19d, 19e, 19f, and 19g; two flat sections 19h and 19i; and two arc-shaped sections 19j and 19k, as shown in FIGS. 5-7. Also, the four support portions 19d to 19g are formed in either a chamfered shape (see FIG. 7) or a rounded shape (see FIG. 8). Accordingly, by forming at least two support portions 19d and 19e of the bearing engagement part 19b of the intermediate gear support axle 19 into a chamfered or rounded shape, it is possible to rotate the feed roller intermediate gear 13 while supporting a circular support bearing unit 13a of the feed roller intermediate gear 13 with the two support portions 19d and 19e of the bearing engagement part 19b of the intermediate gear support axle 19. The support portions 19d and 19e are an example of the "first support portion" of the present invention, and the support portions 19f and 19g are an example of the "second support portion" of the present invention.

The mounting axle 19a has a uniform diameter when it is not mounted in the support axle mounting hole 1e, as shown in FIG. 3. The mounting axle 19a is mounted in the support axle mounting hole 1e by crimping, as shown in FIG. 4. As a result of an increase in the diameter of the mounting axle 19a due to the crimping, the outer peripheral surface of the mounting axle 19a is brought into contact with the inner peripheral surface of the support axle mounting hole 1e with a specific amount of pressure.

Also, as shown in FIG. 2, the feed roller intermediate gear 13 formed from a resin or the like for rotating the feed roller gear 6 meshes with the feed roller gear 6. The feed roller intermediate gear 13 is provided with a circular bearing unit 13a, as shown in FIG. 3. The bearing engagement part 19b of the metallic intermediate gear support axle 19 which rotatably supports the feed roller intermediate gear 13 is inserted through the circular bearing unit 13a of the feed roller intermediate gear 13. Also, the feed roller intermediate gear 13 has a small gear that meshes with the feed roller gear 6, and a large gear that has a greater diameter than the small gear and meshes with the drive transmission gear 12, as shown in FIG. 2. A shown in FIG. 3, the feed roller intermediate gear 13 is mounted on the bearing engagement part 19b of the intermediate gear support axle 19, and is positioned by being held between the large gear of the drive transmission gear 12 (see FIG. 2) and the large gear of the feed roller gear 6 (not shown).

Also, a groove 19c is formed by roll forming on the outer peripheral surface of the bearing engagement part 19b in the vicinity of an end of the gear support axle 19 opposite the mounting axle 19a, as shown in FIG. 3. A stopping washer 20 is mounted in the groove 19c, as shown in FIG. 4. The feed roller intermediate gear 13 is thereby prevented from coming loose from the bearing engagement part 19b. Also, the drive transmission gear 12 formed from a resin or the like for rotating the feed roller intermediate gear 13 has a small gear that meshes with the feed roller intermediate gear 13, and a large gear that has a greater diameter than the small gear, as shown in FIG. 2. The large gear of the drive transmission gear 12 meshes with the motor gear 9 to rotate the drive transmission gear 12.

Also, as shown in FIG. 1, both ends of the press roller 3 have a smaller diameter than that of the outermost peripheral surface of the press roller 3, and are rotatably supported by the pair of press roller bearings 5 provided to the side surfaces 1b and 1c of the chassis 1. The pair of press roller bearings 5 are mounted on the bearing support plate 7 provided to the inner sides of both the side surfaces 1b and 1c of the chassis 1. This bearing support plate 7 is configured so as to press the press roller 3 against the feed roller 2 with a pressing mechanism, which is not shown in Figures.

Also, the thermal head 11 is mounted in between the side surfaces 1b and 1c of the chassis 1 so as to be capable of pivoting around a thermal head support 1a, as shown in FIG. 1. The thermal head 11 is configured so as to allow ink sheets (not shown) and paper (not shown) to be held between the thermal head 11 and a rubber platen roller (not shown).

The pivotable intermediate gear 14a engages the feed roller gear 6. Furthermore, when the pivotable intermediate gear 14a pivots, the pivotable intermediate gear 14a is capable of engaging the ink sheet take-up gear 15, which is fitted to an ink sheet take-up member (not shown in Figures). Also, the intermediate gears 14b transmit the drive force to the roller axle 16 on which the paper supply/ejection roller 17 is mounted, from the feed roller gear 6 via the roller axle gear 18.

Next, the operation of the heat transfer printer according to the first embodiment will be described with reference to FIGS. 1, 2, 5, and 6. First, during the printing operation, the motor gear 9 rotates in the direction of the arrow E (see FIG. 2) in response to the driving of the motor 8. Therefore, the drive transmission gear 12 and the feed roller intermediate gear 13 rotate in the direction of the arrows F and G in FIG. 2, respectively. Accordingly, the feed roller gear 6 rotates in the direction of the arrow H in FIG. 2. The drive force of the motor 8 is transmitted from the feed roller gear 6 to the thermal head 11 via the intermediate gear 14a, and is also transmitted from the intermediate gear 14a to the ink sheet take-up member (not shown) via the ink sheet take-up gear 15. The drive force of the motor 8 is transmitted from the feed roller gear 6 to the roller axle 16 via the plurality of intermediate gears 14b and the roller axle gear 18. The thermal head 11 is thereby pivoted during the printing operation in a direction in which pressure is applied to the platen roller (not shown), which is the direction of the arrow A shown in FIG. 1. As a result, the paper (not shown) is conveyed in the forward direction (the direction of the arrow C in FIG. 1) by the feed roller 2 and the press roller 3 while being pressed by the thermal head 11 against the platen roller.

At this time, according to the present embodiment, the feed roller intermediate gear 13 receives a force F2 from the drive transmission gear 12 and a reaction force F3 from the feed roller gear 6 during rotation of the feed roller intermediate gear 13, which together create a resultant force F1, as shown in FIG. 5. The circular bearing unit 13a of the feed roller intermediate gear 13 is thereby pressed on by the two support portions 19d and 19e of the bearing engagement part 19b of the intermediate gear support axle 19, and a frictional force is therefore applied between the two support portions 19d and 19e and the bearing unit 13a of the feed roller intermediate gear 13. The magnitude of this frictional force increases or decreases as the magnitude of the force F1 which is exerted on the feed roller intermediate gear 13 due to rotation fluctuates.

As a result of the increase or decrease in the magnitude of the frictional force, a force is generated that moves the position at which the bearing unit 13a contacts the bearing engagement part 19b to the left and right along the outer peripheral surface of the bearing engagement part 19b. Specifically, when the force F1 increases, the frictional force between the bearing unit 13a and the two support portions 19d and 19e also increases. In this case, a force is generated to move the position at which the bearing unit 13a contacts the bearing engagement part 19b in the direction of the arrow α in FIG. 5 along the outer peripheral surface of the bearing engagement part 19b.

In other words, the intermediate gear support axle 19 is formed such that the angles θ1 defined by the support portions 19d and 19e satisfy the following equation:

$$\theta 1 > \tan^{-1} \mu$$

where μ is the dynamic friction coefficient when the force F1 is the maximum, and θ1 is the angular position of the edge of the support portion 19d or 19e relative to the center of the bearing unit 13a and the center of the flat section 19h.

Conversely, when the force F1 decreases, the frictional force between the bearing unit 13a and the two support portions 19d and 19e also decreases. In this case, a force is generated to move the position at which the bearing unit 13a contacts the bearing engagement part 19b in the direction of the arrow β in FIG. 5 along the outer peripheral surface of the bearing engagement part 19b.

In the first embodiment, as described above, the bearing engagement part 19b of the intermediate gear support axle 19 is formed into a substantially oval shape. Furthermore, the two support portions 19d and 19e are formed at the boundary between a flat section 19h and the arc-shaped sections 19j and 19k so as to be supported by the circular bearing unit 13a of the feed roller intermediate gear 13 at two positions. Specifically, the support portions 19d and 19e are formed at positions that are inclined to the left and right at a specific angle θ1 relative to the line of force F1, which is the force that passes through the center of the feed roller intermediate gear 13 and is applied to the feed roller intermediate gear 13 as the feed roller intermediate gear 13 rotates.

Therefore, as compared with the case where the bearing unit 13a of the feed roller intermediate gear 13 is supported at a single location on the peripheral surface of the bearing engagement part 19b, the bearing unit 13a of the feed roller intermediate gear 13 is less likely to move along the outer peripheral surface of the bearing engagement part 19b of the intermediate gear support axle 19. Therefore, it is possible to prevent the position at which bearing unit 13a of the feed roller intermediate gear 13 contacts the bearing engagement part 19b from moving along the outer peripheral surface of the bearing engagement part 19b, even when the force F1 exerted on the feed roller intermediate gear 13 as the feed roller intermediate gear 13 rotates fluctuates, the magnitude of the frictional force F1 between the bearing unit 13a of the feed roller intermediate gear 13 and the two support portions 19d and 19e of the intermediate gear support axle 19 changes accordingly, and a force is generated to move along the outer peripheral surface of the bearing engagement part 19b the position at which bearing unit 13a contacts the bearing engagement part 19b.

Accordingly, fluctuations in the rotation the feed roller intermediate gear 13 can be suppressed, making it possible to suppress the occurrence of fluctuations in the rotation of the feed roller gear 6, which results from fluctuations in the rotation of the feed roller intermediate gear 13. As a result, during the printing operation, non-uniform feeding of paper by the feed roller 2 can be prevented. Therefore, it is possible to accurately control the conveying of paper and improve the printing quality. There is also no need to improve the precision of the components because it is sufficient to merely form the bearing engagement part 19b of the intermediate gear support axle 19 into an oval shape.

Also, when paper is conveyed in the reverse direction (the direction of the arrow D in FIG. 1) during non-printing operation, the motor gear 9 rotates in the direction of the arrow I (see FIG. 2) as the motor 8 rotates in the reverse direction. Therefore, the drive transmission gear 12 and the feed roller intermediate gear 13 rotate in the direction of the arrows J and K in FIG. 2, respectively, and the feed roller gear 6 rotates in the direction of the arrow L. Here, the ink sheet take-up member (not shown) does not rotate because the pivotable intermediate gear 14a does not engage the ink sheet take-up gear 15. At this time, the thermal head 11 is pivoted in a direction away from the platen roller (not shown) (the direction of the arrow B in FIG. 1), and the paper (not shown) is conveyed in the reverse direction (the direction of the arrow D in FIG. 1) by the feed roller 2 and the press roller 3 without being pressed on by the thermal head 11.

At this time, the feed roller intermediate gear 13 receives a force F5 from the drive transmission gear 12 and a reaction force F6 from the feed roller gear 6 during rotation of the feed roller intermediate gear 13, which together create a resultant force F4 as shown in FIG. 6. The circular bearing unit 13a of the feed roller intermediate gear 13 is thereby pressed on by the two support portions 19f and 19g of the bearing engagement part 19b of the intermediate gear support axle 19, and a frictional force is therefore applied between the two support portions 19f and 19g and the bearing unit 13a of the feed roller intermediate gear 13.

The magnitude of this frictional force increases or decreases as the magnitude of the force F4 that is exerted on the feed roller intermediate gear 13 due to rotation of the feed roller intermediate gear 13 fluctuates. As a result of the increase or decrease in the magnitude of the frictional force, a force acts to move the position at which the bearing unit 13a contacts the bearing engagement part 19b to the left and right along the outer peripheral surface of the bearing engagement part 19b.

Specifically, when the force F4 increases, the magnitude of the frictional force between the bearing unit 13a and the two support portions 19f and 19g also increases. In this case, a force acts to move the position at which the bearing unit 13a contacts the bearing engagement part 19b in the direction of the arrow γ in FIG. 6 along the outer peripheral surface of the bearing engagement part 19b.

In other words, the intermediate gear support axle 19 is formed such that the angles θ2 defined by the support portions 19f and 19g satisfy the following equation:

$$\theta 2 > \tan^{-1} \mu$$

where μ is the dynamic friction coefficient when the force F2 is the maximum, and θ2 is the angular position of the edge of the support portion 19f or 19g relative to the center of the bearing unit 13a and the center of the flat section 19i.

Conversely, when the force F1 decreases, the magnitude of the frictional force between the bearing unit 13a and the two support portions 19d and 19e also decreases. In this case, a force acts to move the position at which the bearing unit 13a contacts the bearing engagement part 19b in the direction of the arrow δ in FIG. 6 along the outer peripheral surface of the bearing engagement part 19b.

As discussed above, according to the first embodiment, the bearing engagement part 19b of the intermediate gear support axle 19 is formed into a substantially oval shape. The two support portions 19f and 19g are formed on the boundary between one flat section 19i and the circular sections 19j and 19k so as to support the circular bearing unit 13a of the feed roller intermediate gear 13 at two positions. Specifically, the two support portions 19f and 19g are formed at inclined positions of a specific angle θ2 to the left and right relative to the line of force F4, which is the force that passes through the center of the feed roller intermediate gear 13 and is applied to the feed roller intermediate gear 13 due to rotation of the feed roller intermediate gear 13.

Accordingly, as compared with the case where bearing unit 13a of the feed roller intermediate gear 13 is supported at a single location on the peripheral surface of the bearing engagement part 19b, the bearing unit 13a of the feed roller intermediate gear 13 is less likely to move along the outer peripheral surface of the bearing engagement part 19b of the intermediate gear support axle 19. Therefore, it is possible to prevent the position at which the bearing unit 13a of the feed roller intermediate gear 13 contacts the bearing engagement part 19b from moving left and right along the outer peripheral surface of the bearing engagement part 19b, even when the force F4 that is exerted on the feed roller intermediate gear 13 as the feed roller intermediate gear 13 rotates fluctuates, the magnitude of the frictional force F4 between the bearing unit 13a of the feed roller intermediate gear 13 and the two support portions 19f and 19g of the intermediate gear support axle 19 fluctuates accordingly, and a force is generated to move the position at which the bearing unit 13a contacts the bearing engagement part 19b along the outer peripheral surface of the bearing engagement part 19b as a result. Accordingly, fluctuations in the rotation of the feed roller intermediate gear 13 can thereby be suppressed, making it possible to suppress the occurrence of fluctuations in the rotation of the feed roller gear 6, which results from fluctuations in the rotation of the feed roller intermediate gear 13. As a result, non-uniform feeding of paper by the feed roller 2 can be prevented during non-printing operation. It is therefore possible to accurately control the conveying of paper.

In the first embodiment, as described above, as a result of forming the bearing engagement part 19b of the intermediate gear support axle 19 into an oval shape having two flat sections 19h and 19i, it is possible to form support portions at the border portions of either of the flat sections 19h and 19i, depending on the direction of rotation in which the feed roller intermediate gear 13 rotates, whether in the forward direction or the reverse direction.

Figure 9:
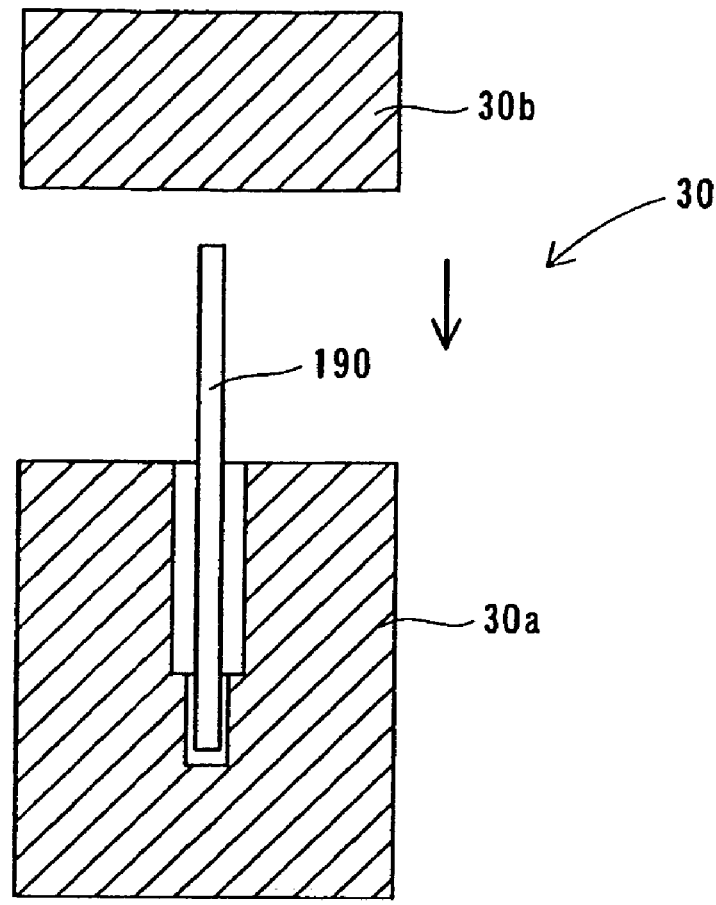
FIG. 9 is a diagram for describing the method of manufacturing the intermediate gear support axle used in the heat transfer printer according to the first embodiment shown in FIG. 1.
Figure 10:
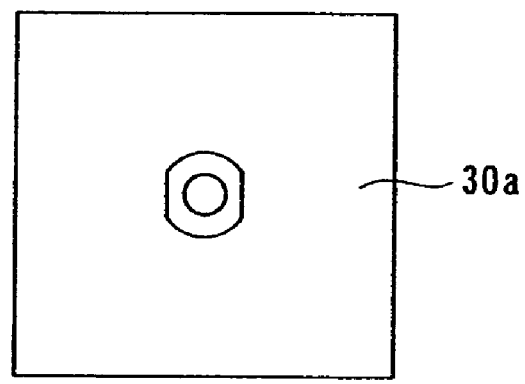
FIG. 10 is a diagram for describing the method of manufacturing the intermediate gear support axle used in the heat transfer printer according to the first embodiment shown in FIG. 1.
Figure 11:
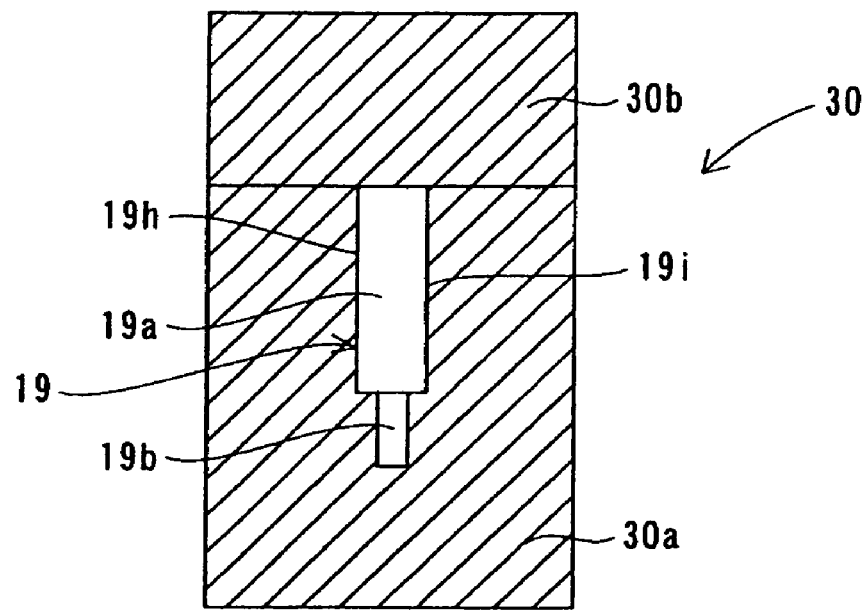
FIG. 11 is a diagram for describing the method of manufacturing the intermediate gear support axle used in the heat transfer printer according to the first embodiment shown in FIG. 1.

FIGS. 9 through 11 are diagrams for describing the method of manufacturing the intermediate gear support axle used in the heat transfer printer according to the first embodiment of the present invention. Next, the method of manufacturing the intermediate gear support axle in the heat transfer printer according to the first embodiment will be described with reference to FIGS. 9 through 11.

Generally speaking, the method of manufacturing the intermediate gear support axle 19 in accordance with the first embodiment is performed so that the intermediate gear support axle 19 (see FIG. 11) is formed by forging a metal rod 190 using a header apparatus 30 having molds 30a and 30b, as shown in FIG. 9. At this time, according to the first embodiment, the intermediate gear support axle 19 is formed unitarily in the mold 30a on the receiving side (cavity side) of the header apparatus 30. The mold 30a is provided with a circular hole and an oval hole for forming the mounting axle 19a and the bearing engagement part 19b of the intermediate gear support axle 19, as shown in FIG. 10.

According to an example of the manufacturing method, the header apparatus 30 having the mold 30a on the receiving side is first provided. The metal rod 190 is then placed in the mold 30a, which is the receiving side of the header apparatus 30. The metal rod 190 is then deformed into a shape of the intermediate gear support axle 19 by lowering the mold 30b, which is the hammer side of the header apparatus 30, and applying pressure to the metal rod 190, as shown in FIG. 11. The mold 30b is then raised, after which the intermediate gear support axle 19 is removed from the mold 30a.

This operation yields an intermediate gear support axle 19 that has a mounting axle 19a and an oval bearing engagement part 19b, which has two flat sections 19h and 19i corresponding to the holes in the mold 30a. A groove 19c (see FIG. 3) is then formed by roll forming on the outer peripheral surface of the bearing engagement part 19b in the vicinity of the end of the gear support axle 19 opposite from the mounting axle 19a. The intermediate gear support axle 19 according to the first embodiment shown in FIG. 3 is thus formed as described above.

Figure 12:
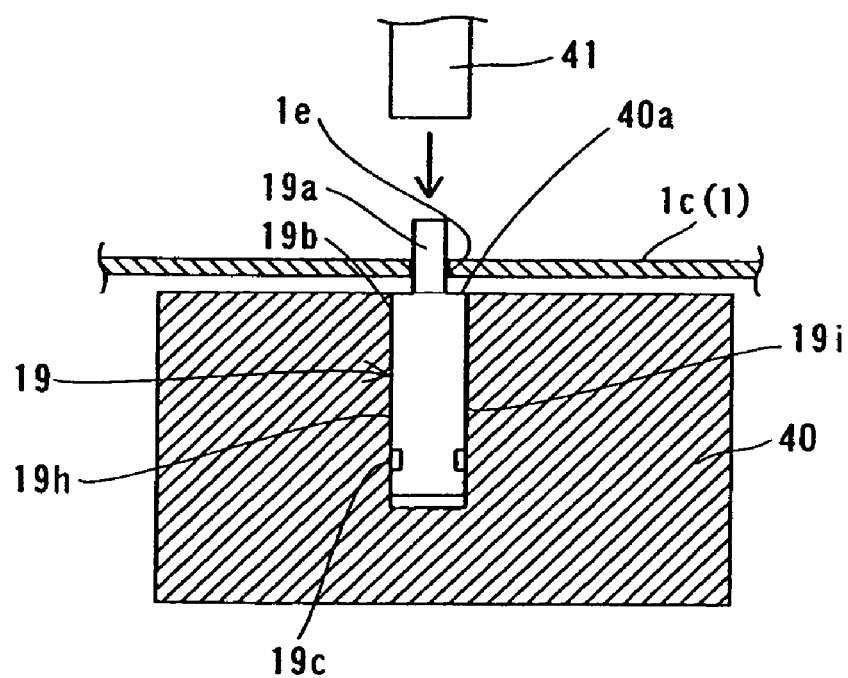
FIG. 12 is a diagram for describing the process of mounting the intermediate gear support axle used in the heat transfer printer according to the first embodiment shown in FIG. 1.
Figure 13:
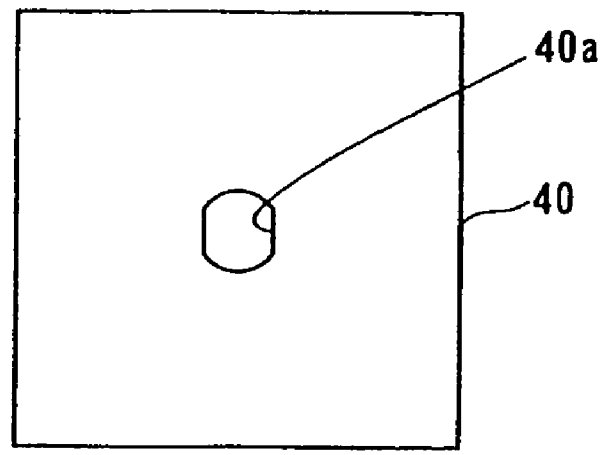
FIG. 13 is a diagram for describing the process of mounting the intermediate gear support axle used in the heat transfer printer according to the first embodiment shown in FIG. 1.
Figure 14:
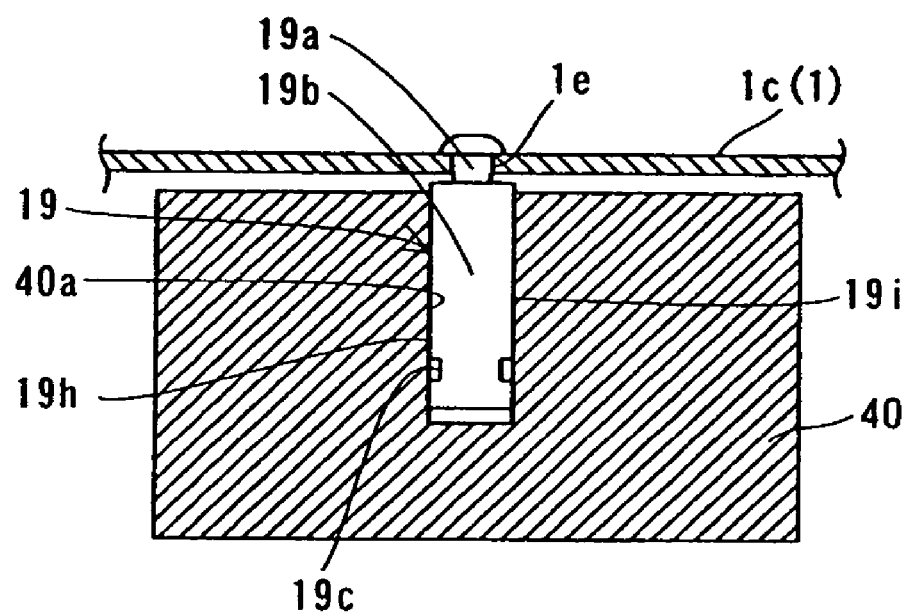
FIG. 14 is a diagram for describing the process of mounting the intermediate gear support axle used in the heat transfer printer according to the first embodiment shown in FIG. 1.

FIGS. 12 through 14 are diagrams for describing the process of mounting the intermediate gear support axle 19 on the chassis 1 of the heat transfer printer according to the first embodiment of the present invention. Next, the process of mounting the intermediate gear support axle 19 on the chassis 1 of the heat transfer printer according to the first embodiment will be described with reference to FIGS. 12 through 14.

In the process of mounting the intermediate gear support axle 19 in the first embodiment, as shown in FIG. 12, the mounting axle 19a of the intermediate gear support axle 19 is inserted through the support axle mounting hole 1e in the side surface 1c of the chassis 1. Then, the bearing engagement part 19b of the intermediate gear support axle 19 is held by the axle holding hole 40a of a jig 40 (see FIG. 13). The axle holding hole 40a has an oval shape that corresponds to that of the bearing engagement part 19b, as shown in FIG. 13. In this case, the intermediate gear support axle 19 is angularly positioned by fitting the two flat sections 19h and 19i of the bearing engagement part 19b (see FIG. 12) in the flat section of the oval axle holding hole 40a of the jig 40.

Crimping is then performed by striking with a hammer 41 the end of the mounting axle 19a that protrudes from the support axle mounting hole 1e. The mounting axle 19a is thereby fixedly secured in the support axle mounting hole 1e because the external diameter of the end of the mounting axle 19a increases due to crimping, as shown in FIG. 14. At this time, the diameter of the mounting axle 19a also increases, whereby the outer peripheral surface of the mounting axle 19a is brought into contact with the inner peripheral surface of the support axle mounting hole 1e with a specific amount of pressure.

Second Embodiment

Referring now to FIG. 15-24 an image forming apparatus in accordance with a second embodiment will now be explained. In view of the similarity between the first and second embodiments, the parts of the second embodiment that are identical to the parts of the first embodiment will be given the same reference numerals as the parts of the first embodiment.

Figure 15:
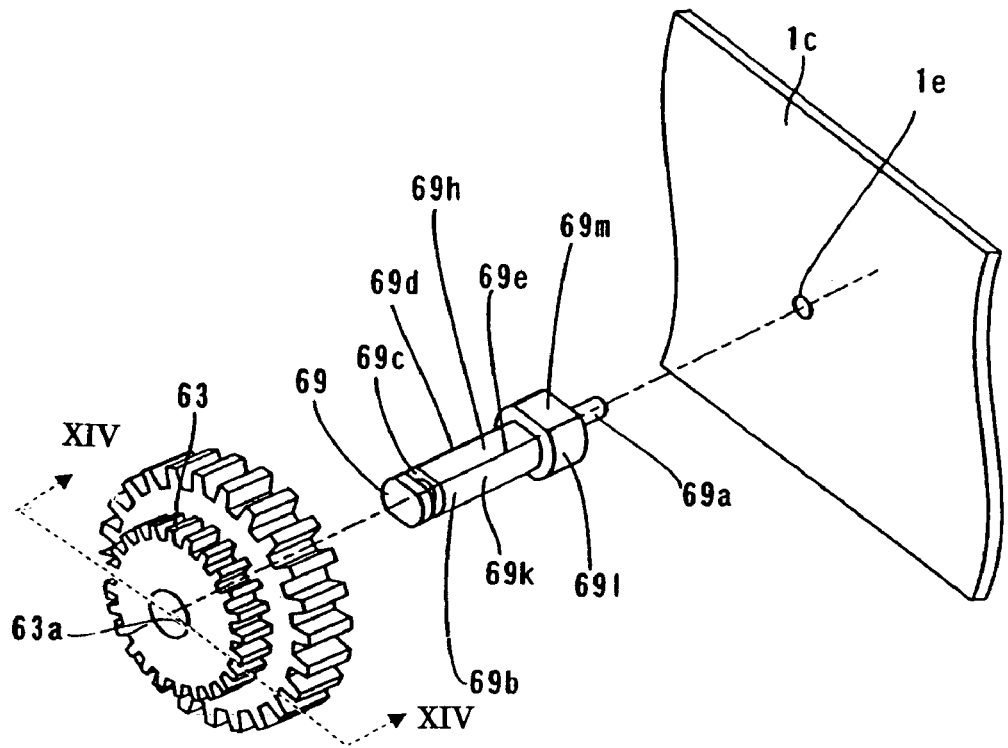
FIG. 15 is an exploded perspective view showing the mounting structure of the intermediate gear support axle in the heat transfer printer according to the second embodiment of the present invention.
Figure 16:
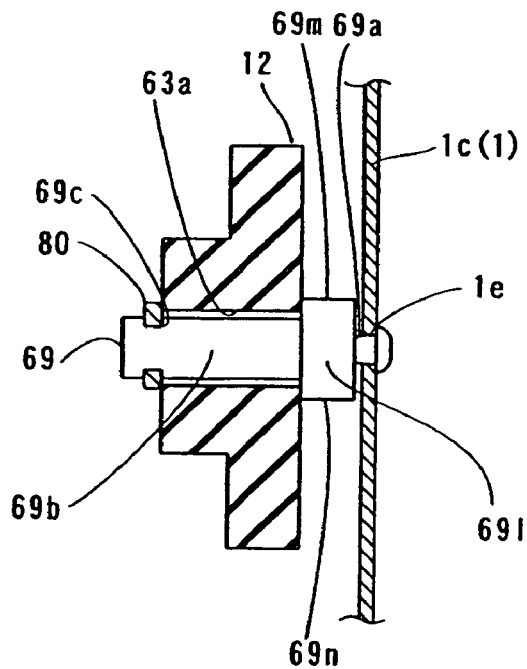
FIG. 16 is a cross-sectional view showing the mounting structure of the intermediate gear support axle in the heat transfer printer according to the second embodiment shown in FIG. 15, as viewed along the arrow XVI-XVI shown in FIG. 15.
Figure 17:
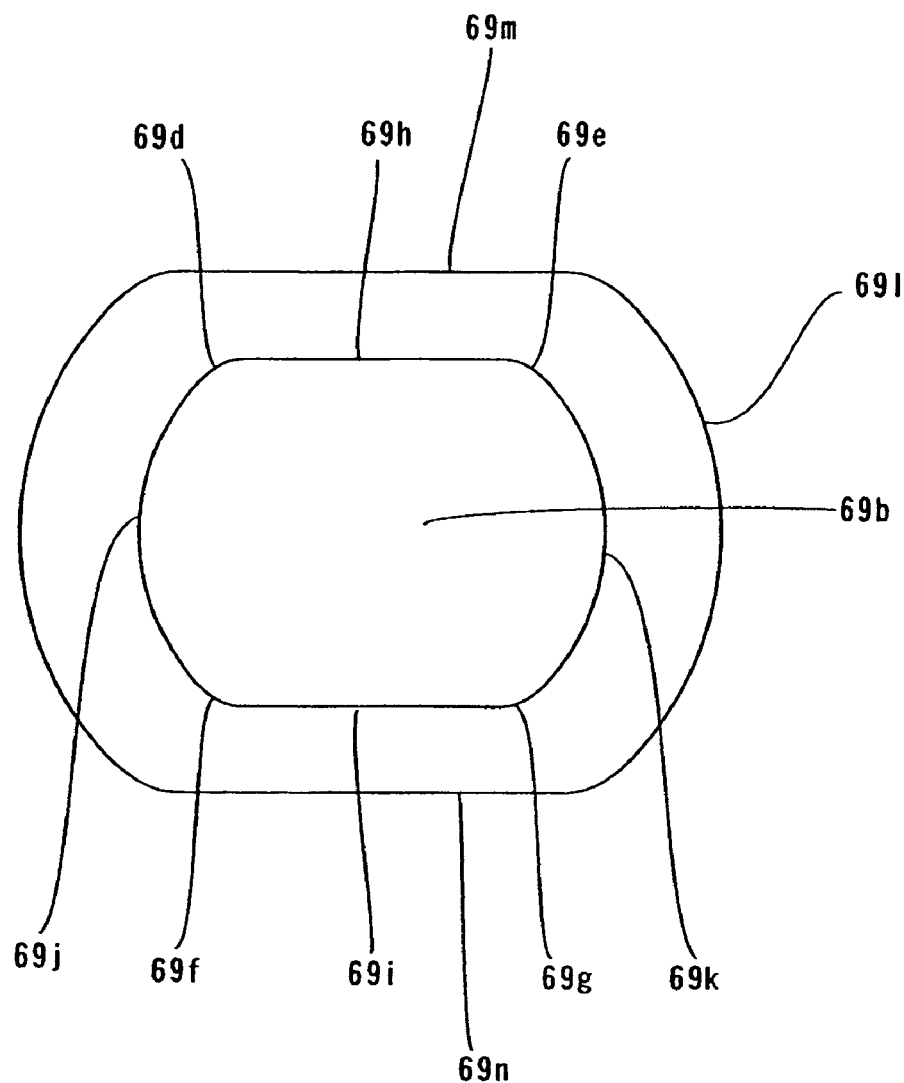
FIG. 17 is a plan view of the intermediate gear support axle in the heat transfer printer according to the second embodiment shown in FIG. 15.

FIG. 15 is an exploded perspective view showing the mounting structure of the intermediate gear support axle of the heat transfer printer according to the second embodiment of the present invention. FIG. 16 is a cross-sectional view showing the mounting structure of the intermediate gear support axle of the heat transfer printer according to the second embodiment shown in FIG. 15. FIG. 17 is a plan view showing the intermediate gear support axle of the heat transfer printer according to the second embodiment shown in FIG. 15.

In the second embodiment, an example is described wherein a seat is further provided between the bearing engagement part and the mounting axle of the intermediate gear support axle. This seat has a larger diameter than that of the bearing engagement part. Furthermore, the seat has an oval flat section larger than that of the oval shape of the bearing engagement part. Other than the structure, manufacturing method, and mounting process of the intermediate gear support axle, the second embodiment is similar to the first embodiment. Therefore, description of the second embodiment other than that of the intermediate gear support axle will be omitted herein.

In the heat transfer printer according to the second embodiment, an intermediate gear support axle 69 has a mounting bearing unit 69a mounted in the support axle mounting hole 1e of the chassis 1, a seat 691, and a substantially oval bearing engagement part 69b for rotatably supporting the feed roller intermediate gear 13, as shown in FIGS. 15 through 17. The bearing engagement part 69b has four support portions 69*d*, 69*e*, 69*f*, and 69*g*; two flat sections 69*h* and 69*i*; and two circular sections 69*j* and 69*k*, as shown in FIG. 17. The support portions 69*d* and 69*e* are an example of the "first support portions" of the present invention, and the support portions 69*f* and 69*g* are an example of the "second support" of the present invention. Also, the seat 69*l* is provided between the bearing engagement part 69*b* and the mounting axle 69*a*. The seat 69*l* has a larger external diameter than that of the bearing engagement part 69*b*, and has oval flat sections 69*m* and 69*n* that are larger than those of the oval shape of the bearing engagement part 69*b*.

FIGS. 18 through 21 are diagrams for describing the method of manufacturing the intermediate gear support axle used in the heat transfer printer according to the second embodiment of the present invention. Next, the method of manufacturing the intermediate gear support axle that is used in the heat transfer printer according to the second embodiment will be described with reference to FIGS. 19 through 21.

Figure 18:
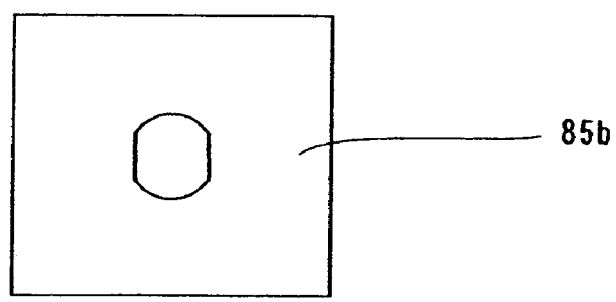
FIG. 18 is a diagram for describing the method of manufacturing the intermediate gear support axle used in the heat transfer printer according to the second embodiment shown in FIG. 15.
Figure 19:
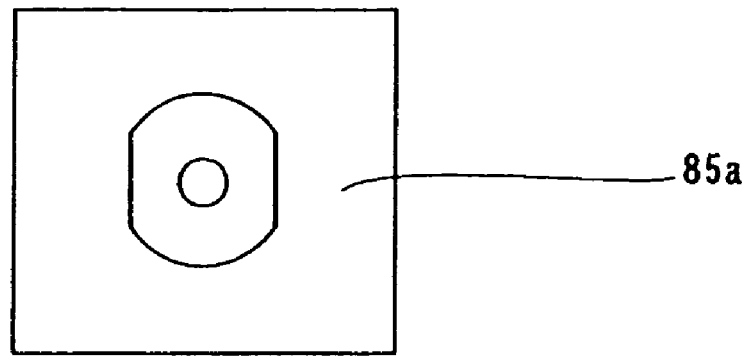
FIG. 19 is a diagram for describing the method of manufacturing the intermediate gear support axle used in the heat transfer printer according to the second embodiment shown in FIG. 15.
Figure 20:
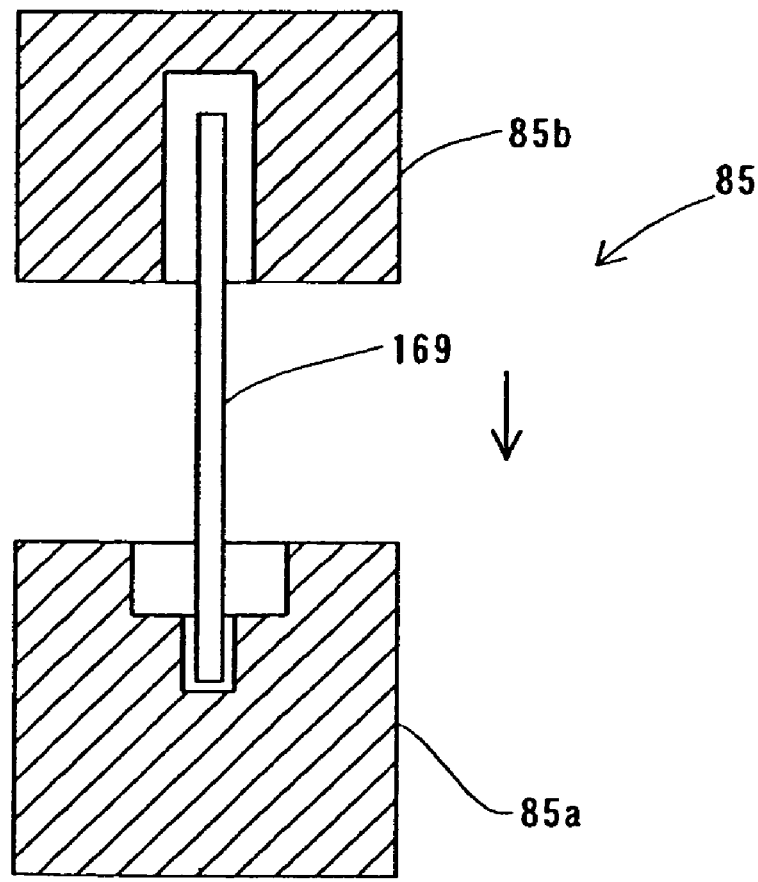
FIG. 20 is a diagram for describing the method of manufacturing the intermediate gear support axle used in the heat transfer printer according to the second embodiment shown in FIG. 15.

In the method of manufacturing the intermediate gear support axle 69 of the second embodiment, the intermediate gear support axle 69 (see FIG. 21) is formed by forging a metal rod 169 using a header apparatus 85 that has molds 85*a* and 85*b*, as shown in FIG. 20. At this time, according to the second embodiment, the intermediate gear support axle 69 is formed unitarily in the mold 85*a* on the receiving side (cavity side) of the header apparatus 85. This mold 85*b* is provided with an oval hole for forming the bearing engagement part 69*b* of the intermediate gear support axle 69, as shown in FIG. 18. Also, the mold 85*a* is provided with a circular hole and an oval hole for forming the mounting axle 69*a* and the seat 69*l* of the intermediate gear support axle 69.

Figure 21:
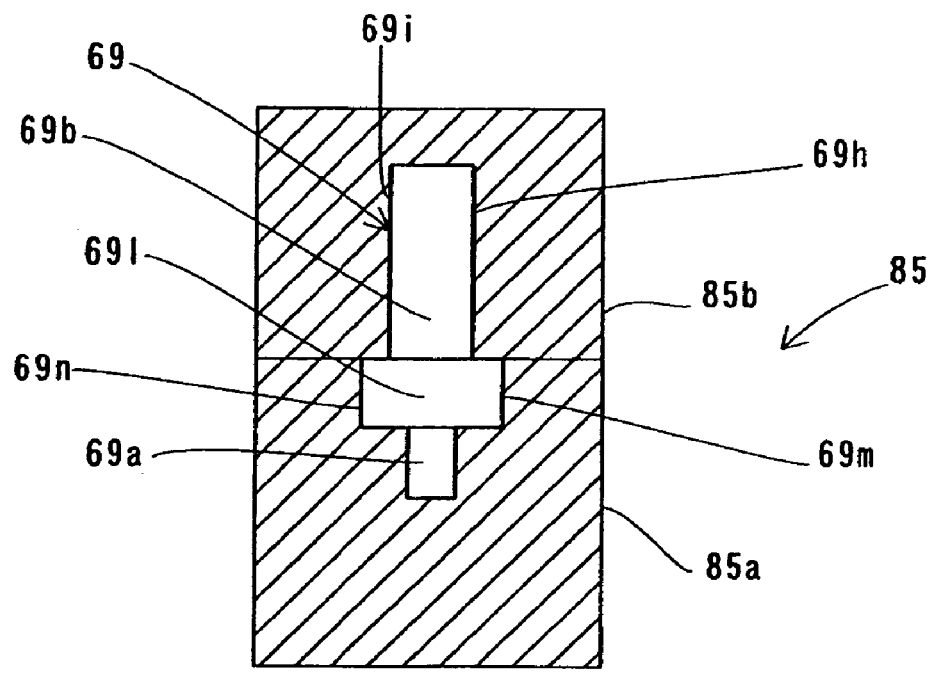
FIG. 21 is a diagram for describing the method of manufacturing the intermediate gear support axle used in the heat transfer printer according to the second embodiment shown in FIG. 15.

In this specific manufacturing method, the header apparatus 85 having the mold 85*a* on the receiving side and a mold 85*b* on the hammer side is first prepared. The metal rod 169 is then placed in the mold 85*a* of the header apparatus 85. The metal rod 169 is then deformed into the shape of the intermediate gear support axle 69 by lowering the mold 85*b* of the header apparatus 85 and applying pressure to the metal rod 169, as shown in FIG. 21. The mold 85*b* is then raised, after which the intermediate gear support axle 69 is removed from the mold 85*a*.

This operation yields an intermediate gear support axle 69 that has a mounting bearing unit 69*a*, an oval bearing engagement part 69*b* having two flat sections 69*h* and 69*i* that correspond to the shape of the hole in the mold 85*a*, and an oval seat 69*l* having two flat sections 69*m* and 69*n*. A groove 69*c* (see FIG. 15) is then formed by rolling in the outer peripheral surface of the intermediate gear support axle 69 in the vicinity of the end on the opposite side of the mounting axle 69*a*. The intermediate gear support axle 69 according to the second embodiment shown in FIG. 15 is thus formed as described above.

Figure 22:
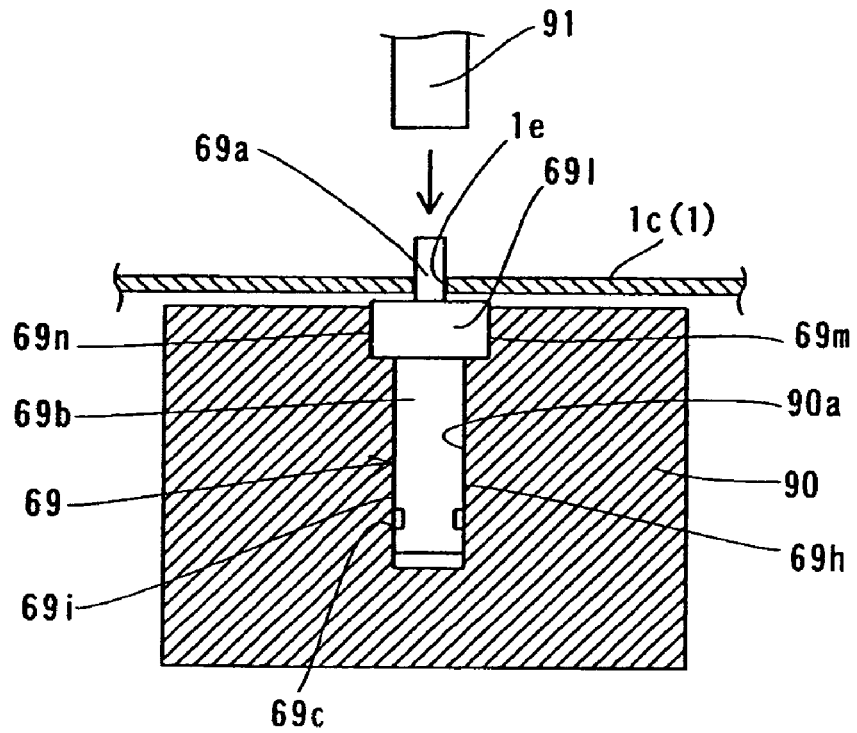
FIG. 22 is a diagram for describing the process of mounting the intermediate gear support axle used in the heat transfer printer according to the second embodiment of the present invention.
Figure 23:
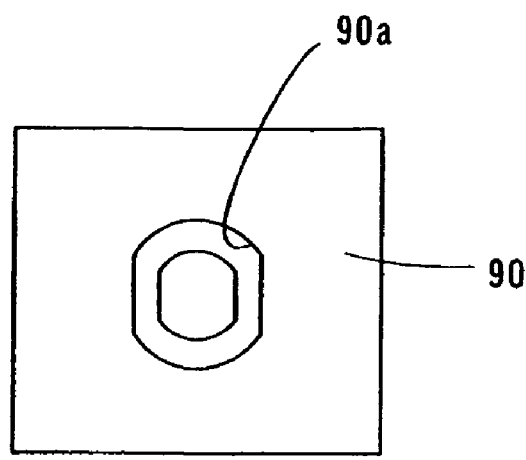
FIG. 23 is a diagram for describing the process of mounting the intermediate gear support axle used in the heat transfer printer according to the second embodiment of the present invention.
Figure 24:
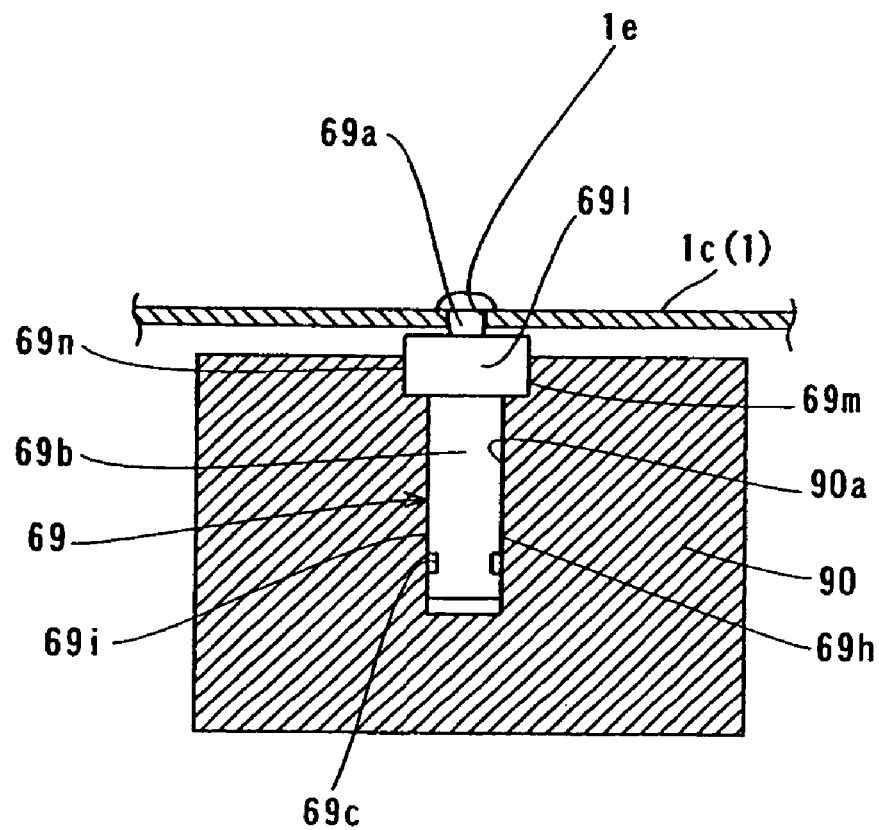
FIG. 24 is a diagram for describing the process of mounting the intermediate gear support axle used in the heat transfer printer according to the second embodiment of the present invention.
Figure 25:
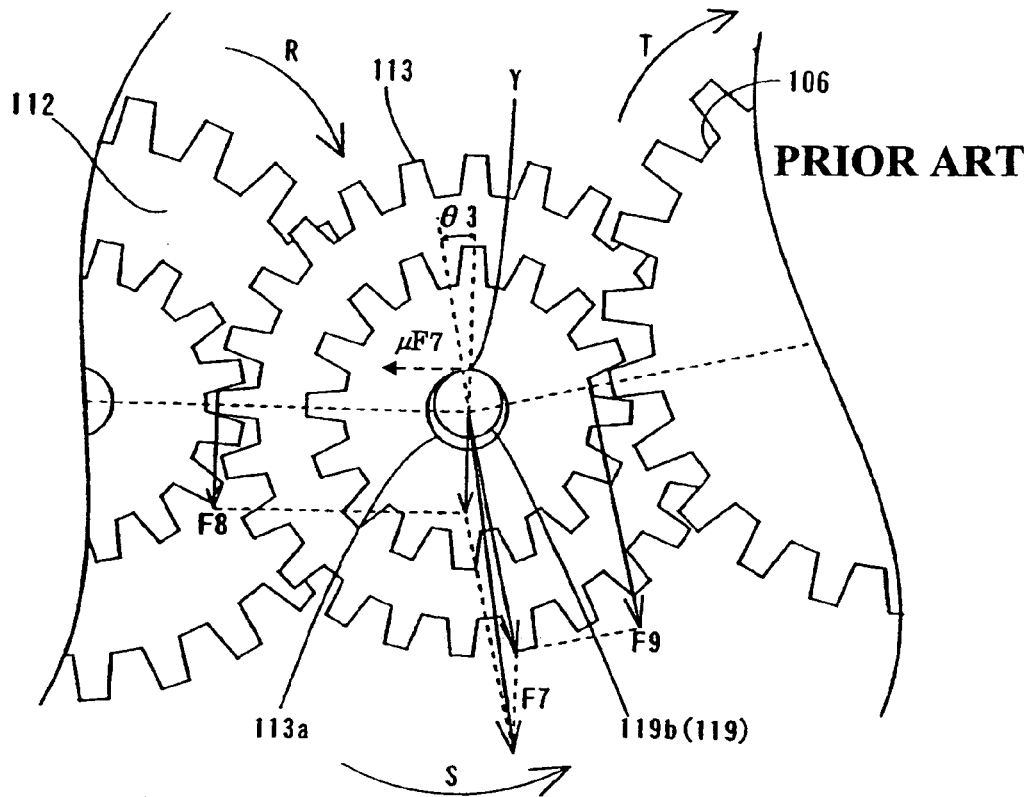
FIG. 25 is a detailed diagram of the feed roller intermediate gear in the conventional heat transfer printer.
Figure 26:
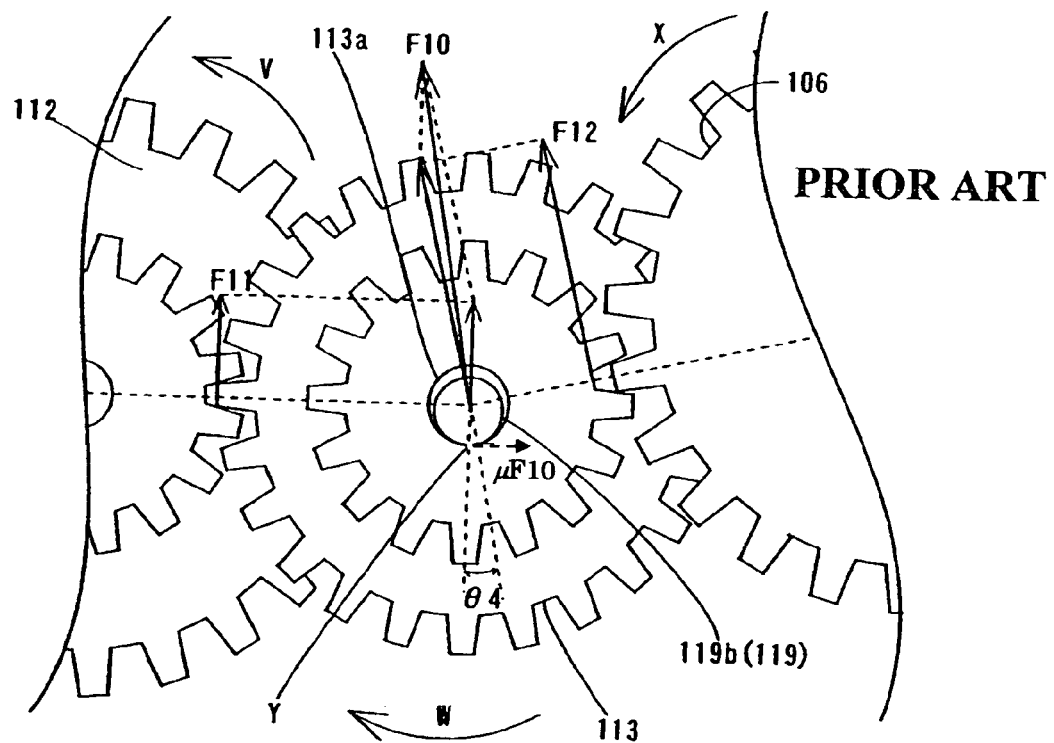
FIG. 26 is a detailed diagram of the feed roller intermediate gear in the conventional heat transfer printer.

FIGS. 22 through 24 are diagrams for describing the process of mounting the intermediate gear support axle 69 in the heat transfer printer according to the second embodiment of the present invention. Next, the process of mounting the intermediate gear support axle in the heat transfer printer according to the second embodiment will be described with reference to FIGS. 22 through 24.

In the process of mounting the intermediate gear support axle 69 of the second embodiment, as shown in FIG. 22, the mounting axle 69*a* of the intermediate gear support axle 69 is inserted through the support axle mounting hole 1*e* of the side surface 1*c* of the chassis 1. The bearing engagement part 69*b* of the intermediate gear support axle 69 is held by an axle holding hole 90*a* of a jig 90. The axle holding hole 90*a* is formed into an oval shape that corresponds to the shapes of the seat 69*l* and the bearing engagement part 69*b*, as shown in FIG. 23.

In this case, the intermediate gear support axle 69 is angularly positioned by aligning the two flat sections 69*m* and 69*n* of the seat 69*l* (see FIG. 22) in the flat sections of the oval axle holding hole 90*a* of the jig 90, which corresponds to the shape of the seat 69*l*. Crimping is then performed by striking the end of the mounting axle 69*a* that protrudes from the support axle mounting hole 1*e* with a hammer 91. The mounting axle 69*a* is fixedly secured in the support axle mounting hole 1*e* in this manner because the external diameter of the end of the mounting axle 69*a* (crimped portion) increases, as shown in FIG. 24. At this time, the diameter of the mounting axle 69*a* increases, whereby the outer peripheral surface of the mounting axle 69*a* is brought into contact with the inner peripheral surface of the support axle mounting hole 1*e* with a specific amount of pressure.

In the second embodiment, as described above, the intermediate gear support axle 69 is provided with a mounting axle 69*a* mounted by crimping in the support axle mounting hole 1*e* of the chassis 1. The intermediate gear support axle 69 also has a seat 69*l* that is provided between the mounting axle 69*a* and the bearing engagement part 69*b*. The seat 69*l* has a larger external diameter than that of the bearing engagement part 69*b*, and oval flat sections 69*m* and 69*n* that are larger than the oval shape of the bearing engagement part 69*b*.

Therefore, it is possible to angularly align the intermediate gear support axle 69 using the oval flat sections 69*m* and 69*n* of the seat 69*l* as a reference, rather than the oval flat sections 69*h* and 69*i* of the bearing engagement part 69*b*. Thus, when the angle of the intermediate gear support axle 69 is to be positioned in mounting the mounting axle 19*a* in the support axle mounting hole 1*e* of the chassis 1 by crimping, it is possible to perform positioning by using larger flat sections than the case where the oval flat sections 69*h* and 69*i* of the bearing engagement part 69*b* are used. Therefore, the oval flat sections 69*h* and 69*i* of the intermediate gear support axle 69 can be more accurately positioned in the rotational angular direction.

Other effects of the second embodiment are similar to those of the first embodiment described above.

The embodiments currently disclosed should be considered merely as examples in all respects and not as being restrictive. The range of the present invention is expressed by the patent claims and not by the above descriptions of the embodiments. The range of the present invention further includes meanings equivalent to the range of the patent claims and all variations within this range.

For example, in the embodiments described above, a heat transfer printer is given as an example of an image forming apparatus. However, the present invention is not limited thereto, and can also be applied to image forming apparatuses other than heat transfer printers as long as such image forming apparatus has a feed roller.

Also, in the embodiments described above, an example is given wherein the seat is formed into an oval shape. However, the present invention is not limited thereto. The seat may be formed into a D-cut shape having larger flat sections than the bearing engagement part.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-218119. The entire disclosure of Japanese Patent Application No. 2004-218119 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image forming apparatus comprising:
    a chassis;
    a motor;
    a drive transmission gear that receives rotational force from the motor;
    a feed roller rotatably supported by the chassis;
    a feed roller gear relatively unrotatably provided to the feed roller;
    an intermediate gear that has a circular bearing, receives rotational force from the drive transmission gear, and transmits rotational force to the feed roller gear; and
    a gear support axle that is inserted through the bearing of the intermediate gear for rotatably supporting the intermediate gear relative to the gear support axle, and is provided with a bearing engagement part, the bearing engagement part having at least one flat section, at least one circular section, and at least two support portions formed between the flat section and the circular section, such that the gear support axle is supported by the bearing at at least one of the two support portions.

2. The image forming apparatus according to claim 1, wherein
    the gear support axle is configured to be supported by the bearing at the two support portions.

3. A image forming apparatus comprising:
    a chassis;
    a motor;
    a drive transmission gear that receives rotational force from the motor;
    a feed roller rotatably supported by the chassis;
    a feed roller gear relatively unrotatably provided to the feed roller;
    an intermediate gear that has a circular bearing, receives rotational force from the drive transmission gear, and transmits rotational force to the feed roller gear; and
    a gear support axle that is inserted through the bearing of the intermediate gear for rotatably supporting the intermediate gear, and is provided with a bearing engagement part, the bearing engagement part having at least one flat section, at least one circular section, and at least two support portions formed between the flat section and the circular section, such that the gear support axle is supported by the bearing at at least one of the two support portions,
    the support portions being formed so as to be positioned at an angular position θ relative to a center of the bearing and a center of the flat section, and
    the angular position θ satisfying $$\theta > \tan^{-1}\mu$$

μ being a dynamic frictional coefficient when a resultant of the rotational force received from the drive transmission gear and the rotational force transmitted to the feed roller gear is maximum.

4. The image forming apparatus according to claim 1, wherein
    the support portions of the bearing engagement part of the gear support axle have a chamfered shape.

5. The image forming apparatus according to claim 1, wherein
    the support portions of the bearing engagement part of the gear support axle have a rounded shape.

6. A image forming apparatus comprising:
    a chassis having a support axle mounting hole formed thereon;
    a motor;
    a drive transmission gear that receives rotational force from the motor;
    a feed roller rotatably supported by the chassis;
    a feed roller gear relatively unrotatably provided to the feed roller;
    an intermediate gear that has a circular bearing, receives rotational force from the drive transmission gear, and transmits rotational force to the feed roller gear; and
    a gear support axle that is inserted through the bearing of the intermediate gear for rotatably supporting the intermediate gear, and is provided with a bearing engagement part, the bearing engagement part having at least one flat section, at least one circular section, and at least two support portions formed between the flat section and the circular section, such that the gear support axle is supported by the bearing at at least one of the two support portions,
    the gear support axle further having a mounting axle that is mounted in the support axle mounting hole of the chassis by crimping.

7. The image forming apparatus according to claim 6, wherein
    the gear support axle further has a seat that is formed between the mounting axle and the bearing engagement part, the seat having an external shape greater than that of the bearing engagement part.

8. A image forming apparatus comprising:
    a chassis;
    a motor;
    a drive transmission gear that receives rotational force from the motor;

a feed roller rotatably supported by the chassis;

a feed roller gear relatively unrotatably provided to the feed roller;

an intermediate gear that has a circular bearing, receives rotational force from the drive transmission gear, and transmits rotational force to the feed roller gear, the intermediate gear being configured to rotate in a forward and a reverse direction; and a gear support axle that is inserted through the bearing of the intermediate gear for rotatably supporting the intermediate gear, and is provided with a bearing engagement part, the bearing engagement part of the gear support axle having two flat section, two circular section, and first and second pairs of support portions formed between the flat sections and the circular sections, such that the gear support axle is supported by the bearing at either of the pairs of support portions regardless of the direction of the rotation of the intermediate gear.

9. An image forming apparatus, comprising:

a chassis;

a motor;

a drive transmission gear that receives rotational force from the motor;

a feed roller rotatably supported by the chassis;

a feed roller gear relatively unrotatably provided to the feed roller;

an intermediate gear that has a circular bearing, receives rotational force from the drive transmission gear, and transmits rotational force to the feed roller gear; and a gear support axle that is inserted through the bearing of the intermediate gear for rotatably supporting the intermediate gear, and is provided with a bearing engagement part, the bearing engagement part having two flat sections, two circular sections, and first and second pairs of support portions formed between the flat sections and the circular sections, such that the gear support axle is supported by the bearing at either of the pairs of support portions, wherein the support portions has either a chamfered or rounded shape, the support portions being formed so as to be positioned at an angular position $\theta$ relative to a center of the bearing and a center of the flat section, and the angular position $\theta$ satisfies $$\theta > \tan^{-1} \mu$$

$\mu$ being a dynamic frictional coefficient when a resultant of the rotational force received from the drive transmission gear and the rotational force transmitted to the feed roller gear is maximum.

* * * * *